(12) United States Patent
Hong et al.

(10) Patent No.: US 6,914,353 B2
(45) Date of Patent: Jul. 5, 2005

(54) LINEAR MOTOR, METHOD FOR CONTROLLING THE SAME, AND LINEAR COMPRESSOR EQUIPPED WITH THE SAME

(75) Inventors: Eon Pyo Hong, Seoul (KR); Kyeong Bae Park, Seoul (KR); Tae Hee Kwak, Inchun-si (KR); Ki Chul Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/855,329

(22) Filed: May 28, 2004

(65) Prior Publication Data

US 2004/0245862 A1 Dec. 9, 2004

(30) Foreign Application Priority Data

Jun. 5, 2003 (KR) .................. 10-2003-0036241

(51) Int. Cl.[7] ............................................... H02K 41/00
(52) U.S. Cl. ....................... 310/13; 310/15; 417/417
(58) Field of Search ................. 310/12–37, 179–208; 417/416, 417; 318/135

(56) References Cited

U.S. PATENT DOCUMENTS

| | | | | | |
|---|---|---|---|---|---|
| 3,624,574 | A | * | 11/1971 | Montagu | ................... 335/210 |
| 3,816,776 | A | * | 6/1974 | Chari | ........................... 310/13 |
| 4,076,998 | A | * | 2/1978 | Montagu | ................... 318/132 |
| 4,090,112 | A | * | 5/1978 | Selverstone | ............... 318/128 |

OTHER PUBLICATIONS

U.S. Appl. No. 10/855,495, filed May 28, 2004, Hong et al.

* cited by examiner

Primary Examiner—Dang Le
(74) Attorney, Agent, or Firm—Greenblum & Bernstein, P.L.C.

(57) ABSTRACT

A linear motor having a reduced size, and capable of being manufactured at reduced cost and having improved efficiency is provided. The linear motor includes a bobbin, a plurality of coil groups wound on the bobbin, the coil groups have different coil thickness, and a magnet linearly movable due to a magnetic field generated by the coil groups.

13 Claims, 4 Drawing Sheets

LINEAR MOTOR, METHOD FOR CONTROLLING THE SAME, AND LINEAR COMPRESSOR EQUIPPED WITH THE SAME

BACKGROUND OF THE INVENTION

1. Field of the Invention

The present invention relates to a linear motor, and more particularly to a linear motor including a plurality of coil groups having different coil thicknesses and wound on a bobbin. Also, the present invention relates to a method for controlling such a linear motor and to a linear compressor equipped with such a linear motor.

2. Description of the Related Art

Generally, a motor is a device that converts electric energy into mechanical energy. Such a motor is widely used in all kinds of machines, such as compressors, blowers, pumps, etc. The motor basically comprises a case, a stator fixed to the case, and a mover rotated or linearly reciprocated by means of an electromagnetic force created between the mover and the stator.

The motors may be classified, on the basis of how the mover is operated, into a rotary motor whose mover is rotated, a linear motor whose mover is linearly reciprocated, and a vibratory motor whose mover is vibrated.

FIG. 1 is a sectional view showing a linear compressor equipped with a linear motor according to the prior art.

As shown in FIG. 1, the conventional linear compressor comprises: a hermetically sealed container 1; a compression unit 4 for compressing a gas coolant, the compression unit 4 comprising a piston 2 and a cylinder 3; and a linear motor 10 for linearly reciprocating the piston in the cylinder 3, the linear motor 10 comprising a stator 5 and a mover 6.

The stator 5 comprises: a laminated outer core 12; an inner core 14 disposed in the outer core 12 such that the inner core 14 is spaced apart from the outer core 12 by a prescribed gap distance; and a coil assembly 20 fixed to the outer core 12. The mover 6 comprises: a magnet 42 disposed between the inner core 12 and the outer core 14; and a magnet frame 44 connected between the magnet 42 and the piston 2 for transmitting linear movement of the magnet 42 to the piston 2.

The coil assembly 20 comprises: a bobbin 24; and a coil 26 wound on the bobbin 24 such that a magnetic field is created at the coil 26 when an electric voltage is applied to the coil 26. The coil is usually wound on the bobbin 24 two turns or more.

The larger the thickness of the coil 26 is, the higher efficiency of the linear motor 10 with the above-stated construction is. The higher the voltage inputted from the outside is, the larger the stroke of the piston 2, which is the distance of movement within which the piston 2 is reciprocated. The more the coil 26 is turned, the smaller the stroke of the piston 2 is.

Generally, a voltage supplied from a power supply is applied to the coil 26 with variation of approximately 15% of a prescribed value (for example, 220 V). When a high voltage exceeding the prescribed value is applied to the coil 26, the stroke of the piston 2 become too large with the result that the piston 2 may collide with peripheral components. For this reason, it is required to provide an additional auxiliary coil (not shown), which is connected to the coil 26 only when the abnormal high voltage is applied to the coil 26. In this case, the number of the turns of the whole coils is increased, whereby the excessive stroke of the piston 2 is not carried out, and thus the above-mentioned collision between the piston and the peripheral components is prevented.

In the conventional linear motor and the conventional linear compressor equipped with the linear motor, however, the number of the turns of the coil 26 is increased providing against input of the high voltage, which occurs only limitedly, with the result that the sizes of the coil assembly 20 and thus the linear motor are increased. Consequently, the production cost of the linear motor and the linear compressor equipped with the linear motor is increased.

SUMMARY OF THE INVENTION

Therefore, the present invention has been made in view of the above problems, and it is an object of the present invention tonprovide a linear motor, the size of which is reduced, whereby the production cost of the linear motor is reduced, and efficiency of the linear motor is improved.

It is another object of the present invention to provide a linear compressor equipped with such a linear motor, the size of which is reduced, whereby the production cost of the linear compressor is reduced, and efficiency of the linear compressor is improved.

It is yet another object of the present invention to provide a method for controlling such a linear motor that is capable of preventing damage to components of the linear motor, which may occur when an abnormally high voltage is applied to the linear motor.

In accordance with one aspect of the present invention, the above and other objects can be accomplished by the provision of a linear motor comprising: a bobbin; a plurality of coil groups wound on the bobbin, the coil groups having different coil thicknesses; and a magnet linearly movable due to a magnetic field generated by means of the coil groups.

In accordance with another aspect of the present invention, there is provided a linear compressor comprising: a cylinder block having a cylinder formed therethrough; a back cover spaced apart from the cylinder block, the back cover having a coolant inlet channel formed therein; an outer core disposed between the cylinder block and the back cover; a bobbin attached to the outer core; a plurality of coil groups having different coil thicknesses, the coil groups being wound on the bobbin; an inner core disposed in the outer core such that the inner core is spaced apart from the outer core; a magnet disposed between the outer core and the inner core, the magnet being linearly movable due to a magnetic field generated by means of the coil groups; a magnet frame with the magnet fixed thereto; a piston connected to the magnet frame such that the piston is linearly reciprocated in the cylinder, the piston having a coolant flow channel formed therethrough; an inlet valve attached to the piston for opening and closing the coolant flow channel of the piston; and an outlet valve attached to the cylinder block for opening and closing the cylinder.

In accordance with yet another aspect of the present invention, there is provided a method for controlling a linear motor, comprising: a first step for detecting an electric voltage inputted from the outside; and a second step for applying the voltage to all of the coil groups when the detected voltage is above a prescribed voltage and to part of the coil groups when the detected voltage is below the prescribed voltage.

BRIEF DESCRIPTION OF THE DRAWINGS

The above and other objects, features and other advantages of the present invention will be more clearly understood from the following detailed description token in conjunction with the accompanying drawings, in which.

DESCRIPTION OF THE PREFERRED EMBODIMENTS

Figure 1:
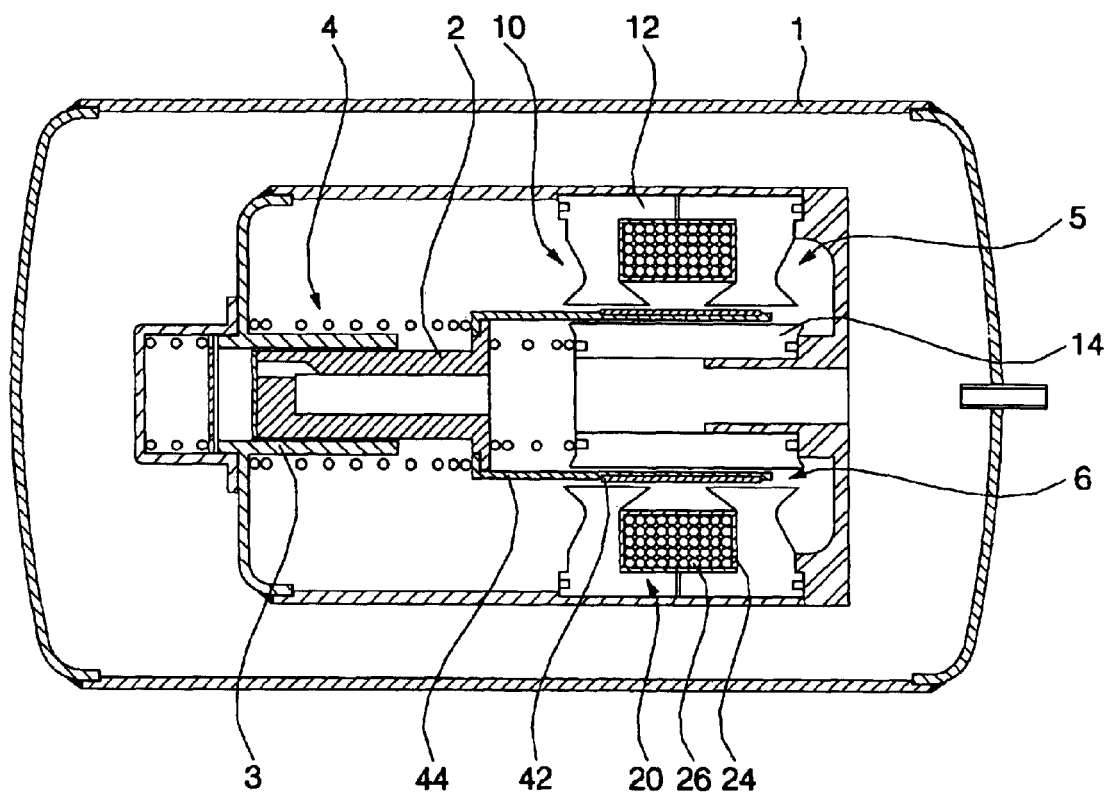
FIG. 1 is a sectional view showing a linear compressor equipped with a linear motor according to the prior art.

Now, preferred embodiments of the present invention will be described in detail with reference to the accompanying drawings. In the drawings, the same or similar elements are denoted by the same reference numerals even though they are depictedcin different drawings, and a detailed description thereof will not be given accordingly.

Figure 2:
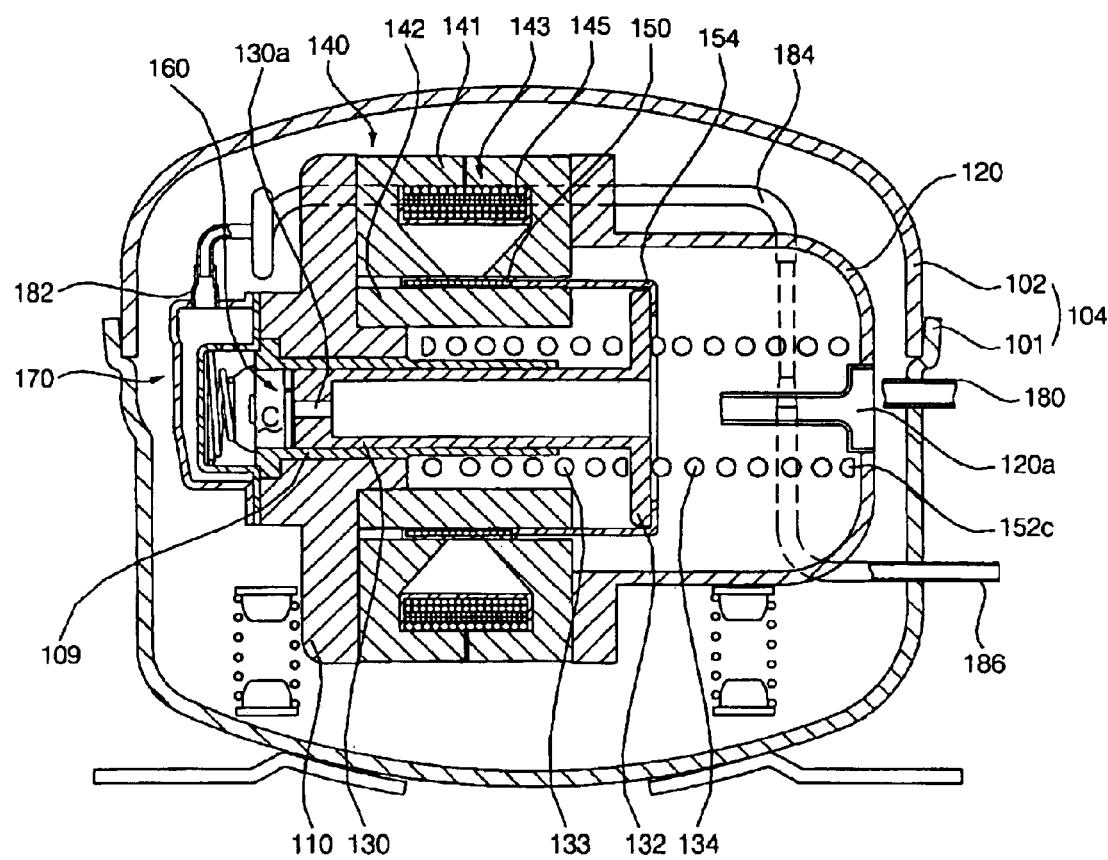
FIG. 2 is a sectional view showing a linear compressor equipped with a linear motor according to a preferred embodiment of the present invention.

FIG. 2 is a sectional view showing a linear compressor equipped with a linear motor according to a preferred embodiment of the present invention.

As shown in FIG. 2, the linear compressor according to the present invention includes a hermetically sealed container 104 comprising a lower container 101 with the upper part thereof opened, and an upper cover 102 for covering the lower container 101.

In the hermetically sealed container 104 is disposed a cylinder block 110 having a cylinder 109 formed therein such that shock applied to the cylinder block 110 is absorbed by means of appropriate means. In the hermetically sealed container 104 is also disposed a back cover 120 having a coolant inlet channel 120a formed therein such that shock applied to the back cover 120 is absorbed by means of appropriate means.

The back cover 129 is disposed while being spaced apart from the cylinder block 110.

The linear compressor further comprises: a piston 130 disposed in the cylinder 109 such that the piston 130 is linearly reciprocated in the cylinder 109, the piston 130 having a coolant flow channel 130a formed therethrough for guiding the coolant introduced through the coolant inlet channel 120a to the interior of the cylinder 109; a linear motor connected to the piston 130 for linearly reciprocating the piston 130; an inlet valve 160 attached to the piston 130 and operated by means of the gas coolant for opening and closing the coolant flow channel 130a; and an outlet valve 170 attached to the cylinder block 110 and operated by means of the gas coolant for opening and closing the cylinder 109. The outlet valve 170 forms a compression chamber C together with the cylinder 109 and the piston 130.

The piston 130 is provided at one end thereof with a fixing part 132 such that the fixing part 132 is extended in the radial direction. The motor 140 is connected to the fixing part 132 of the piston 130. The piston 130 is supported between the cylinder block 110 and the back cover 120 such that shock applied to the piston 130 is absorbed by means of a first spring 133 disposed between one side of the fixing part 132 and the cylinder block 110 and a second spring 134 disposed between the other side of the fixing part 132 and the back cover 120.

The linear motor 140 comprises a stator and a mover. The fixing part 132 of the piston 130 is fixed to one side of the mover. When the mover is linearly reciprocated by means of a magnetic force created at the stator, the piston 130 is linearly reciprocated in the cylinder 109.

The stator comprises: a laminated outer core 141; a laminated inner core 142 disposed such that the inner core 142 is spaced apart from the outer core 141; and a coil assembly 143 fixed to the outer core 141.

The outer core 141 is disposed between the cylinder block 110 and the back cover 120, and fixedly attached to the cylinder block 110 and the back cover 120 by means of an appropriate fastening member.

The inner core 142 is fixedly attached to the cylinder block 110 by means of an appropriate fastening member.

In the coil assembly is mounted a coil 145, which generates a magnetic field when a voltage is applied to the coil 145.

The mover comprises: a magnet 150 disposed between the outer core 141 and the inner core 142; and a magnet frame 154 disposed between the outer core 141 and the inner core 142 such that the magnet frame 154 is linearly reciprocated. The magnet 150 and the piston 130 are fixed to the magnet frame 154.

The outlet valve 170 and the inlet valve 160 are operated as the piston 130 is linearly reciprocated so that the gas coolant is introduced into the hermetically sealed container 104, the introduced gas coolant is guided into the compression chamber C where the gas coolant is compressed, and the compressed gas coolant is discharged.

Reference numeral 180 indicates an inlet connection pipe connected to one side of the hermetically sealed container 104, through which a coolant is introduced into the hermetically sealed container 104 from the outside. Reference numeral 182 indicates an outlet pipe connected to the outlet valve 170. Reference numeral 184 indicates a loop pipe having one end connected to the outlet pipe 182, and reference numeral 186 indicates an outlet connection pipe having one end connected to the loop pipe 184. The outlet connection pipe 186 is penetrated through the hermetically sealed container 104 such that the outlet connection pipe 186 is extended to the outside of the hermetically sealed container 104.

Figure 3:
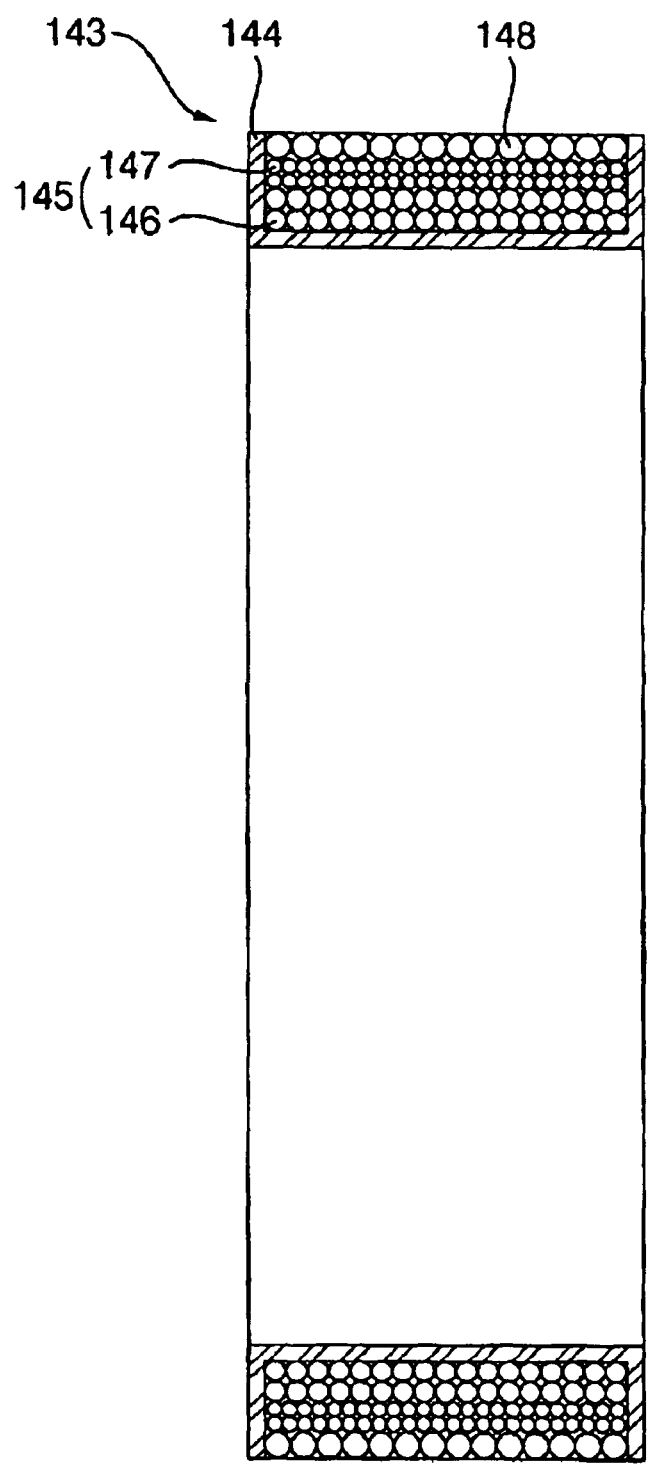
FIG. 3 is an enlarged sectional view showing a coil assembly of the linear compressor equipped with the linear motor according to the preferred embodiment of the present invention.

FIG. 3 is an enlarged sectional view showing the coil assembly 143 of the linear compressor equipped with the linear motor according to the preferred embodiment of the present invention.

As shown in FIG. 3, the coil assembly 143 comprises: a bobbin 144; and a coil 145 wound on the bobbin 144. The coil 145 is comprised of a plurality of coil groups 146 and 147, the thicknesses of which are different from each other.

The bobbin 144 comprises a hollow cylindrical body and extensions formed at both ends of the hollow cylindrical body such that the extensions are protruded outward in the radial direction of the hollow cylindrical body.

The coil groups 146 and 147 are wound on the hollow cylindrical body of the bobbin 144 such that the coil groups 146 and 147 are disposed between the extensions of the bobbin 144. The coil groups 146 and 147 are arranged such that the coil groups 146 and 147 are stacked in the radial direction of the bobbin 144.

The coil group 146, which is wound on the hollow cylindrical body of the bobbin 144, serves as a primary coil group. On the other hand, the coil croup 147, which is wound on the coil group 146, serves as an auxiliary coil group. When the linear compressor is operated at a normal voltage, the voltage is applied only to the primary coil group 146. When the linear compressor is operated at an abnormally high voltage, the voltage is applied not only to the primary coil group 146 but also to the auxiliary coil group 147, whereby the number of the whole turns of the coil is increased when the high voltage is inputted, which occurs only limitedly. Consequently, an excessive stroke of the piston is prevented.

The thickness of each coil of the auxiliary coil group 147 is smaller than that of the primary coil croup 146 so that the sizes of the coil assembly 143 and the linear motor are reduced.

Preferably, the size of the coil assembly is limited to a prescribed value, and the primary coil group 146 having a large coil size and the auxiliary coil group 147 having a small coil size are wound on the bobbin 144. In this case, it is possible that the coil size of the primary coil group 146 is as large as a free space obtained from the thin coil of the auxiliary coil group 147. Consequently, the efficiency of the linear motor is improved.

Reference numeral 148 indicates an insulating member, which covers the outer circumference of the utmost outside coil group, i.e., the auxiliary coil group 147. The insulating member 148 may be an insulating wire wound on the utmost outside coil group 147 such that the insulating wire covers the utmost outside coil group 147, or an injected plastic insulating plate for covering the utmost outside coil group 147.

Figure 4:
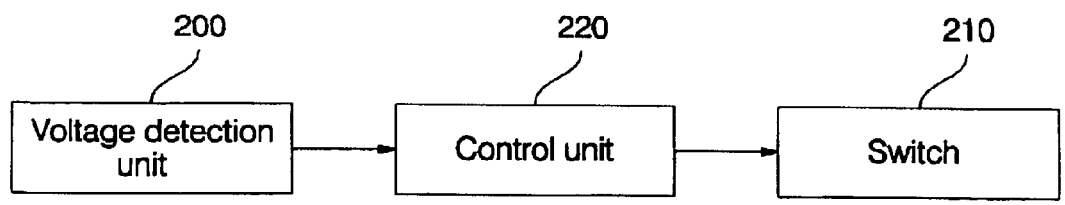
FIG. 4 is a control block diagram of the linear compressor equipped with the linear motor according to the preferred embodiment of the present invention.

FIG. 4 is a control block diagram of the linear compressor equipped with the linear motor according to the preferred embodiment of the present invention.

As shown in FIG. 4, the linear motor comprises: a voltage detection unit 200 for detecting a voltage inputted from the outside; a switch 210 to which the coil groups are connected; and a control unit 220 for outputting a control signal to the switch 210 on the basis of the voltage detected by means of the voltage detection unit 200.

The operation of the present invention with the above-stated construction will now be described.

Figure 5:
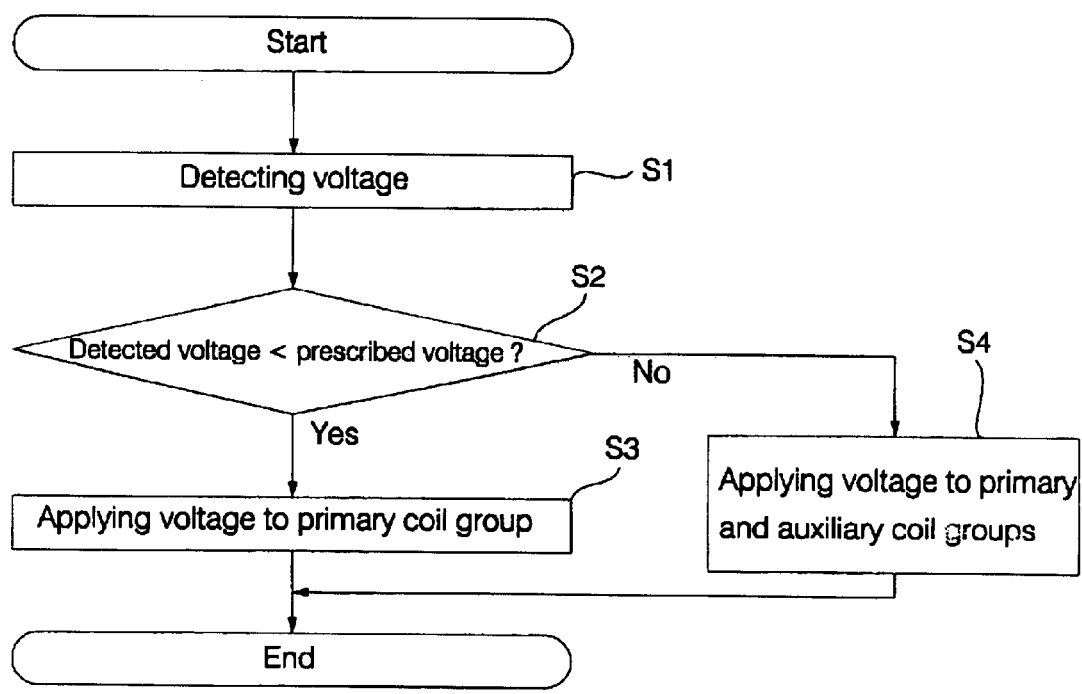
FIG. 5 is a control flow chart of the linear compressor equipped with the linear motor according to the preferred embodiment of the present invention.

FIG. 5 is a control flow chart of the linear compressor equipped with the linear motor according to the preferred embodiment of the present invention.

When a voltage is inputted from a power supply, the voltage is detected by means of the voltage detection unit 200, and the detected value is outputted to the control unit 220 (S1).

The detected voltage is compared with a prescribed voltage (for example, 235 V) by means of the control unit 220 (S2).

When the detected voltage is below the prescribed voltage, the control unit 220 outputs a control signal to the switch 210 so that the voltage is inputted not to the auxiliary coil group 147 but to the primary coil group 146 (S3).

As a result, the primary coil group 146 is charged with electric current, whereby a magnetic field is generated around the primary coil group 146. The magnet 150 is linearly reciprocated due to the magnetic field generated around the primary coil group 146. The linear reciprocating movement of the magnet 150 is transmitted to the piston 130 via the magnet frame 154. Consequently, the piston 130 is linearly reciprocated in the cylinder 109 so that the gas coolant in the compression chamber C is compressed.

When the voltage inputted from the power supply is above the prescribed voltage (for example, 235 V), on the other hand, the control unit 220 outputs a control signal to the switch 210 so that the voltage is inputted not only to the primary coil group 146 but also to the auxiliary coil group 147 (S4).

As a result, the primary coil group 146 and the auxiliary coil group 147 are charged with electric current, whereby magnetic fields are generated around the primary coil group 146 and the auxiliary coil group 147. The magnet 150 is linearly reciprocated due to the magnetic fields generated around the primary coil group 146 and the auxiliary coil group 147. The linear reciprocating movement of the magnet 150 is transmitted to the piston 130 via the magnet frame 154. Consequently, the piston 130 is linearly reciprocated in the cylinder 109 so that the gas coolant in the compression chamber C is compressed.

At this time, the stroke of the piston 130 is not excessively increased since the number of the whole turns of the coil is large when the high voltage is inputted. Consequently, the coolant is effectively compressed while the cylinder 109 does not collide with peripheral components, such as the outlet valve.

As apparent from the above description, a linear motor according to the present invention and a linear compressor according to the present invention have the following advantages.

First, a plurality of coil groups having different coil thicknesses are wound on a bobbin of the linear motor, whereby an excessive stroke of a magnet and a piston is prevented when an abnormally high voltage is inputted. Since the coil thicknesses of the coil groups are different from each other, the size of the linear motor and thus the size of the linear compressor are decreased, whereby the production cost of the linear motor and the linear compressor is reduced.

Second, it is possible that the coil size of one of the coil groups is as large as a free space obtained from the thin coil of the other coil group in the case that the size of the coil assembly is limited to a prescribed value. Consequently, the efficiency of the linear motor is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear motor comprising:
   a bobbin;
   a plurality of coil groups wound on the bobbin, the coil groups having different coil thicknesses; and
   a magnet linearly movable due to a magnetic field generated by the coil groups.

2. The motor as set forth in claim 1, wherein the plurality of coil groups are wound on the bobbin in the circumferential direction of the bobbin.

3. The motor as set forth in claim 1, wherein the plurality of coil groups are stacked on the bobbin in the radial direction of the bobbin.

4. The motor as set forth in claim 1, wherein the plurality of coil groups comprise a primary coil group wound on the bobbin and an auxiliary coil group wound on the primary coil group.

5. The motor as set forth in claim 4, wherein the coil thickness of the auxiliary coil group is smaller than that of the primary coil group.

6. The motor as set forth in claim 1, further comprising a switch for selectively supplying electric current to all or part of the coil groups.

7. The motor as set forth in claim 1, further comprising:

an outer core with the bobbin mounted thereto;

an inner core disposed in the outer core such that the inner core is spaced apart from the outer core; and a magnet frame with the magnet fixed thereto, the magnet frame being linearly moved along with the magnet.

8. A linear compressor comprising:

a cylinder block having a cylinder formed therethrough;

a back cover spaced apart from the cylinder block, the back cover having a coolant inlet channel formed therein;

an outer core disposed between the cylinder block and the back cover;

a bobbin attached to the outer core;

a plurality of coil groups having different coil thicknesses, the coil groups being wound on the bobbin;

an inner core disposed in the outer core such that the inner core is spaced apart from the outer core;

a magnet disposed between the outer core and the inner core, the magnet being linearly movable due to a magnetic field generated by the coil groups;

a magnet frame with the magnet fixed thereto;

a piston connected to the magnet frame such that the piston is linearly reciprocated in the cylinder, the piston having a coolant flow channel formed therethrough;

an inlet valve attached to the piston for opening and closing the coolant flow channel of the piston; and an outlet valve attached to the cylinder block for opening and closing the cylinder.

9. The compressor as set forth in claim 8, wherein the plurality of coil groups are wound on the bobbin in the circumferential direction of the bobbin.

10. The compressor as set forth in claim 8, wherein the plurality of coil groups are stacked on the bobbin in the radial direction of the bobbin.

11. The compressor as set forth in claim 8, wherein the plurality of coil groups comprise a primary coil group wound on the bobbin and an auxiliary coil group wound on the primary coil group.

12. The compressor as set forth in claim 11, wherein the coil thickness of the auxiliary coil group is smaller than that of the primary coil group.

13. The compressor as set forth in claim 8, further comprising a switch, the coil groups being connected to the switch.

* * * * *